US009535957B1

(12) United States Patent
Chambers et al.

(10) Patent No.: US 9,535,957 B1
(45) Date of Patent: Jan. 3, 2017

(54) ELECTRONIC FILE MANAGEMENT BASED ON USER AFFINITY

(71) Applicant: International Business Machines Corporation, Armonk, NY (US)

(72) Inventors: Lisa M. Chambers, Placitas, NM (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/949,971

(22) Filed: Nov. 24, 2015

(51) Int. Cl.
*G06F 7/00* (2006.01)
*G06F 17/30* (2006.01)

(52) U.S. Cl.
CPC ..... *G06F 17/3053* (2013.01); *G06F 17/30554* (2013.01); *G06F 17/30572* (2013.01)

(58) Field of Classification Search
CPC ............ G06F 17/3053; G06F 17/30554; G06F 17/30572; G06F 17/30651; G06F 19/26; G06F 8/34
USPC .......................... 707/730, 750, 723, 999.006
See application file for complete search history.

(56) References Cited

U.S. PATENT DOCUMENTS

| | | | | |
|---|---|---|---|---|
| 7,268,791 B1 * | 9/2007 | Jannink | ............. | G06F 17/30994 345/440 |
| 7,612,280 B2 | 11/2009 | Schneider | | |
| 2001/0021914 A1 * | 9/2001 | Jacobi | ..................... | G06Q 30/02 705/14.53 |
| 2002/0032772 A1 * | 3/2002 | Olstad | ............... | G06F 17/30864 709/224 |
| 2003/0118087 A1 * | 6/2003 | Goldthwaite | ..... | G06F 17/30873 375/219 |
| 2003/0149698 A1 * | 8/2003 | Hoggatt | ............ | G06F 17/30339 |
| 2005/0021531 A1 * | 1/2005 | Wen | ................... | G06F 17/30873 |
| 2006/0195516 A1 * | 8/2006 | Beaupre | ............ | G06F 17/30766 709/203 |
| 2007/0203872 A1 * | 8/2007 | Flinn | ...................... | G06N 5/048 706/62 |

(Continued)

OTHER PUBLICATIONS

Braue, David; "iTunes: Just how random is random?"; CNET; Mar. 7, 2007;Updated: Aug. 4, 2008; © CBS Interactive Inc.; pp. 1-7; <http://www.cnet.com/news/itunes-just-how-random-is-random/>.

(Continued)

*Primary Examiner* — Mohammed R Uddin
(74) *Attorney, Agent, or Firm* — Isaac J. Gooshaw

(57) ABSTRACT

A method, computer program product and computer system are provided. A processor receives a plurality of pointers corresponding to a plurality of electronic files. A processor determines at least one affinity score for the plurality of electronic files based, at least in part, on one or more usage patterns of a user. A processor generates a geometric diagram including a plurality of regions, wherein the geometric diagram is represented by a matrix. A processor assigns the plurality of pointers to the plurality of regions based, at least in part, on the at least one affinity score. A processor selects at least one pointer of the plurality of pointers based, at least in part, on a selection area of the geometric area, where the at least one pointer is located within the selection area. A processor generates a list including the at least one pointer of the plurality of pointers.

20 Claims, 6 Drawing Sheets

(56) References Cited

U.S. PATENT DOCUMENTS

| | | |
|---|---|---|
| 2008/0098027 A1 | 4/2008 | Aarts |
| 2010/0115231 A1 | 5/2010 | Yui |
| 2011/0028138 A1* | 2/2011 | Davies-Moore .... G06F 3/04817 455/418 |
| 2012/0144117 A1* | 6/2012 | Weare ................ G06F 12/0888 711/119 |
| 2012/0242660 A1* | 9/2012 | Kim ....................... G06T 19/20 345/419 |
| 2013/0018896 A1* | 1/2013 | Fleischman ............ G06Q 50/01 707/748 |
| 2013/0124951 A1* | 5/2013 | Shechtman ............. G06T 13/80 715/201 |
| 2015/0186977 A1* | 7/2015 | Leonard ............. G06Q 30/0631 705/26.7 |

OTHER PUBLICATIONS

Eastlake et al.; "Randomness Requirements for Security (RFC4086)"; Original Publication Date: Jun. 1, 2005; IP.com Electronic Publication: Jun. 4, 2005; IP.com No. 000125500; Copyright © The Internet Society, (2005); pp. 1-48.

* cited by examiner

ELECTRONIC FILE MANAGEMENT BASED ON USER AFFINITY

BACKGROUND OF THE INVENTION

The present invention relates generally to the field of randomization, and more particularly to generating a pseudorandom list of electronic files based on a user affinity.

Pseudo-randomization is the process of generating an outcome that appears random but is not. Pseudorandom outcomes typically exhibit some statistical randomness while being generated by an entirely set of deterministic rules or procedures. A pseudorandom list is a series of pseudorandom outcomes. Particularly, a pseudorandom list provides an order of items that appear random, however the list is driven by an underlying set of procedures. Affinity is a liking or inclination towards something. A user's affinity indicates how much a user prefers a particular item.

SUMMARY

Embodiments of the present invention provide a method, computer system, and computer program product to generate a pseudo-random list of items. A processor receives a plurality of items. A processor determines at least one affinity score for the plurality of items based on one or more usage patterns of a user. A processor generates a geometric diagram including a plurality of regions, where the geometric diagram is represented by a matrix. A processor assigns the plurality of items to the plurality of regions based on the at least one affinity score. A processor selects at least one item of the plurality of items based on a selection area of the geometric area, where the at least one item is located within the selection area. A processor generates a list including the at least one item of the plurality of items.

DETAILED DESCRIPTION

Figure 1:
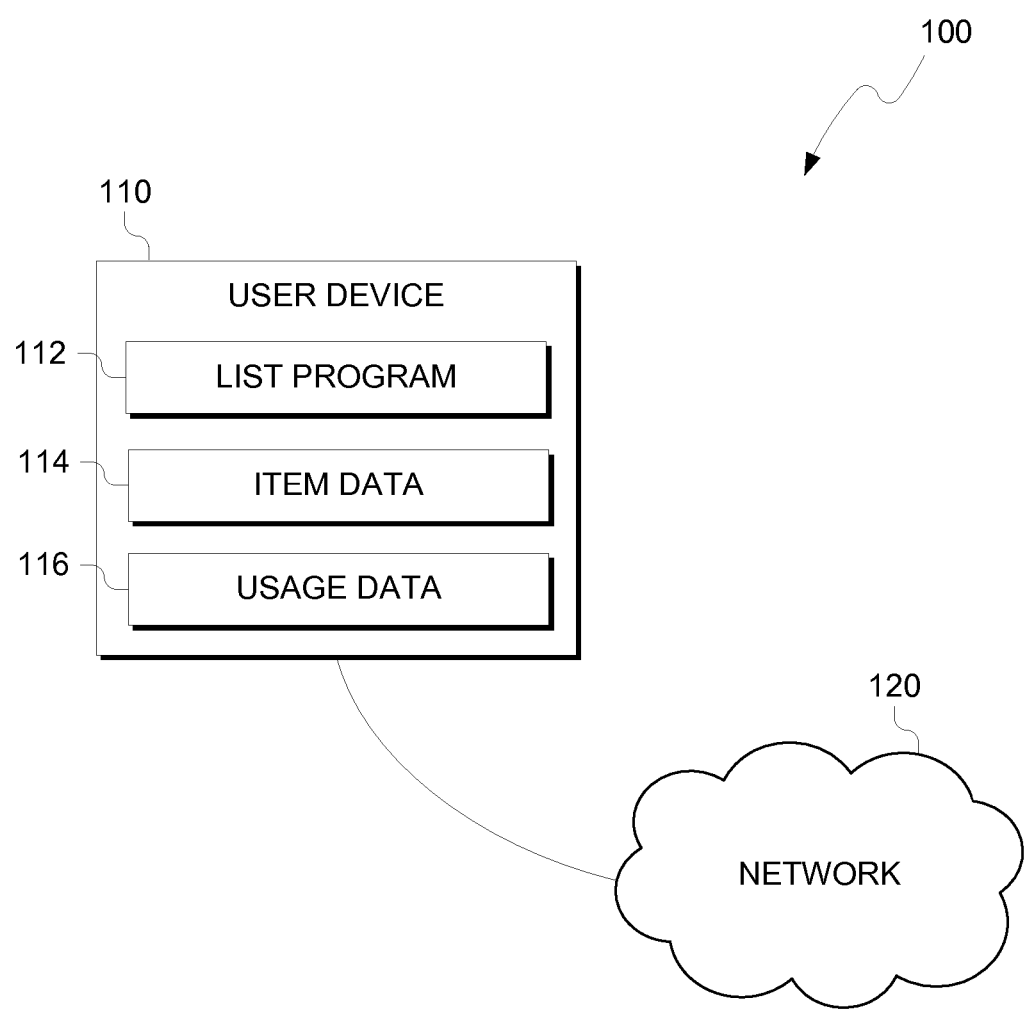
FIG. 1 is a functional block diagram illustrating a networked environment, in accordance with an embodiment of the present invention.

While solutions to generating random lists are known, they typically create chaotic lists with no reasoning in the order presented. Other pseudorandom lists typically create a subset by filtering items and then randomly ordering the items within the subset. Embodiments of the present invention recognize that by generating multiple sets based on a usage of a user and affinity of items in the list, a pseudo-random list that follows preferences of a user is provided. For example, some embodiments of the present invention generate a playlist of media, such as music files. Based on the type, order, and environmental factors, such as time of day and location, embodiments of the present invention determine usage patterns of a user. Based on the usage patterns of the user, embodiments of the present invention generate an affinity score for items in the list. Embodiments of the present invention generates multiple subsets of items based on the affinity score. Embodiments of the present invention provide various rules and representations to select from the various sets to provide a pseudorandom selection of items that match a affinity of a user for items in the list while appearing random to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 connected over network 120. User device 110 includes list program 112, item data 114 and usage data 116.

In various embodiments of the present invention, user device 110 is a computing device that can be a standalone device, a server, a laptop computer, a tablet computer, a netbook computer, a personal computer (PC), or a desktop computer. In another embodiment, user device 110 represents a computing system utilizing clustered computers and components to act as a single pool of seamless resources. In general, user device 110 can be any computing device or a combination of devices with access to item data 114 and usage data 116 and is capable of executing list program 112. User device 110 may include internal and external hardware components, as depicted and described in further detail with respect to FIG. 4.

In this exemplary embodiment, list program 112, item data 114, and usage data 116 are stored on user data 110. However, in other embodiments, list program 112, item data 114, and usage data 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110 and other devices (not shown), in accordance with a desired embodiment of the present invention.

In various embodiments, list program 112 generates a list of items. Items are different entities that are selected to form a list. In some scenarios and embodiments, items include media files such as audio files, video files, image files. In further scenarios and embodiments, items include playlists or other collections of files. In other scenarios and embodiments, items include data files such as word documents or database entries. In another scenario, items include programming constructs or variable such as items in an array or variables in a process. One of ordinary skill in the art will appreciate that any item can be selected from a variety of data types and combined with other items to create a list without deviating from the invention. In some embodiments, item data 114 includes the items for list program 112 to include in generating a list. In other embodiments, the items are stored on a separate device (not shown) and item data 114 includes descriptive information regarding the items, such as metadata of the items. For example, metadata includes an artist, genre, actor, and the like for media files. In some scenarios and embodiments, item data 112 includes links or pointers to the location of items, with metadata stored in item data 114. In other scenarios and embodiments, list program 112 receives items, and the respective metadata, from another device or program.

In various embodiments, list program 112 receives a group of items to generate a list. In some scenarios and embodiments, list program 112 receives the items directly. In other scenarios and embodiments, list program 112 receives links or pointers to the items, directing list program 112 to a memory location or device where the items are stored. In some embodiments, list program 112 receives one or more constraints when generating the list. For example, list program 112 receives a list size constraint indicating a desired size of the list (e.g., generate a list with five items). As another example, list program 112 receives a content constraint indicating a type of desired content (e.g., generate a list with music from Artist A). As another example, list program 112 receives a value constraint indicating a range of values to include or exclude from the list (e.g., generate a list of items with a file size less than 2 MBs).

In some embodiments, list program 112 generates a list based on usage data 116. Usage data 116 includes various usage patterns or preferences of a user. As a user opens, views or listens to items, usage data 116 stores an indication of the item along with any metadata associated with the item. As a user interacts with items, list program 112 determines usage patterns based on common or frequent interactions with the items. For example, usage data 116 includes a distribution of movie genres for video files a user has previously viewed. As a user continues to watch videos in a particular genre, the distribution or weight to the genre is increased. In some scenarios and embodiments, list program 112 updates usage data 116 based on usage of item by a user. In other scenarios and embodiments, another program (not shown) generates usage data 116 and provides usage data 116 to list program 112.

When generating a list, list program 112 compares the usage data 116 to item data 114 to determine an affinity score for each item. The affinity score indicates the degree that a user prefers each item. For example, if a user often listens to a particular genre of music, then usage data 116 indicates such a pattern. When compared to item data 114, list program 112 determines a different affinity score for items with the same or similar genre than other items with a different genre. As discussed herein, a lower affinity score indicates a greater interest in an item by a user than a higher affinity score. One of ordinary skill in the art will appreciate that a different dimensionality of the affinity score may be used without deviating from the invention. For example, a higher affinity score indicates a greater interest for an item versus an item with a lower affinity score.

In some embodiments, usage data 116 also includes information indicating the time and location of certain usage patterns. For example, usage data 116 includes usage patterns for different times of such as for different hours, days, weeks or year. As such, usage data 116 indicates the frequency of item interaction and the respective descriptive information of the item (e.g., every morning the user listens to a particular music genre). As another example, usage data 116 includes location data indicating particular location and usage patterns associated with the locations (e.g., the user watches drama video items when at home). Based on the current time and location of the user, list program 112 determines an affinity score for each item. Based on overall usage patterns and usage patterns associated with current time and location, list program 112 determines an affinity score for each item.

Figure 3A:
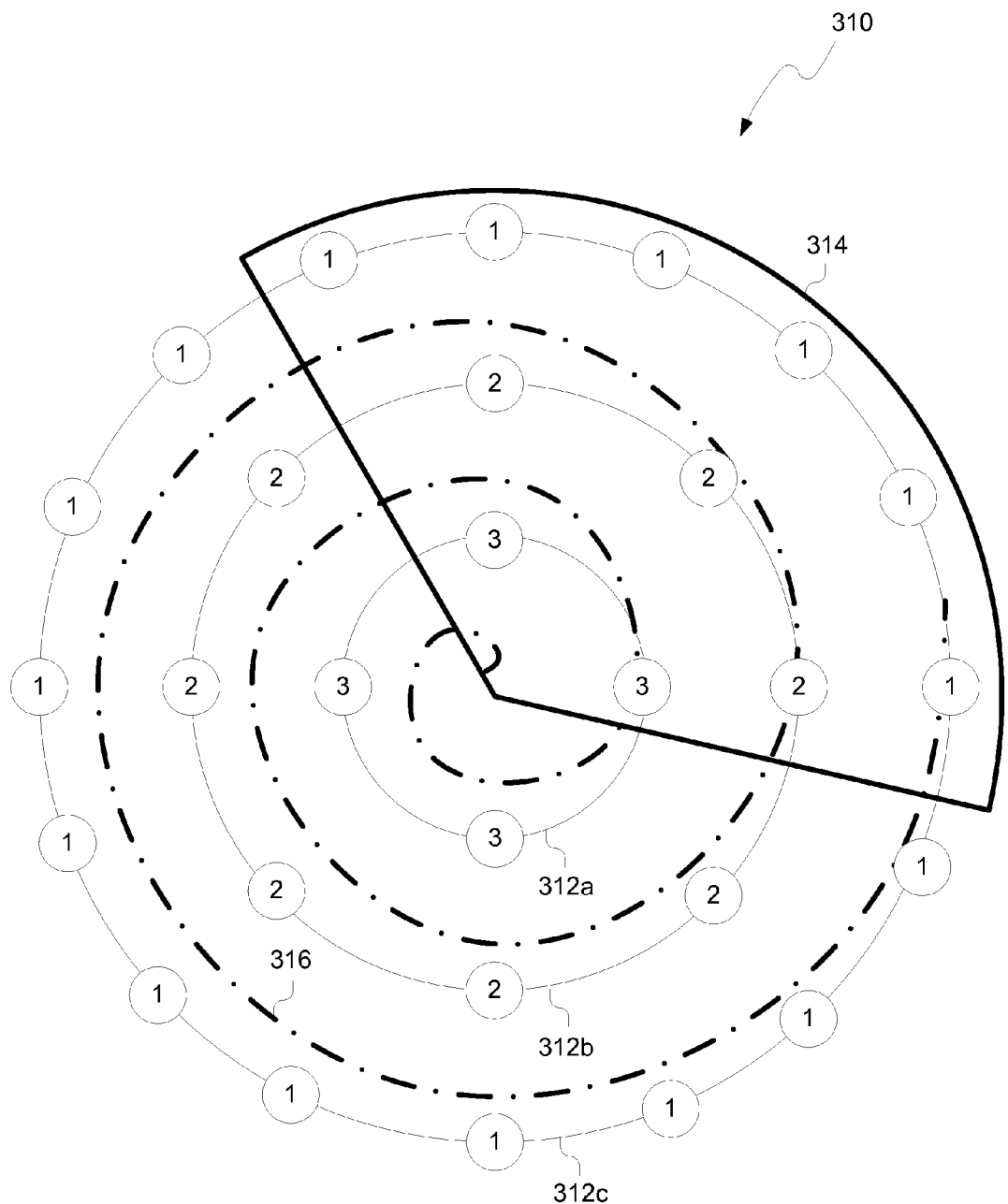
FIG. 3A depicts a visualization of an orbital item selection, in accordance with an embodiment of the present invention.
Figure 3B:
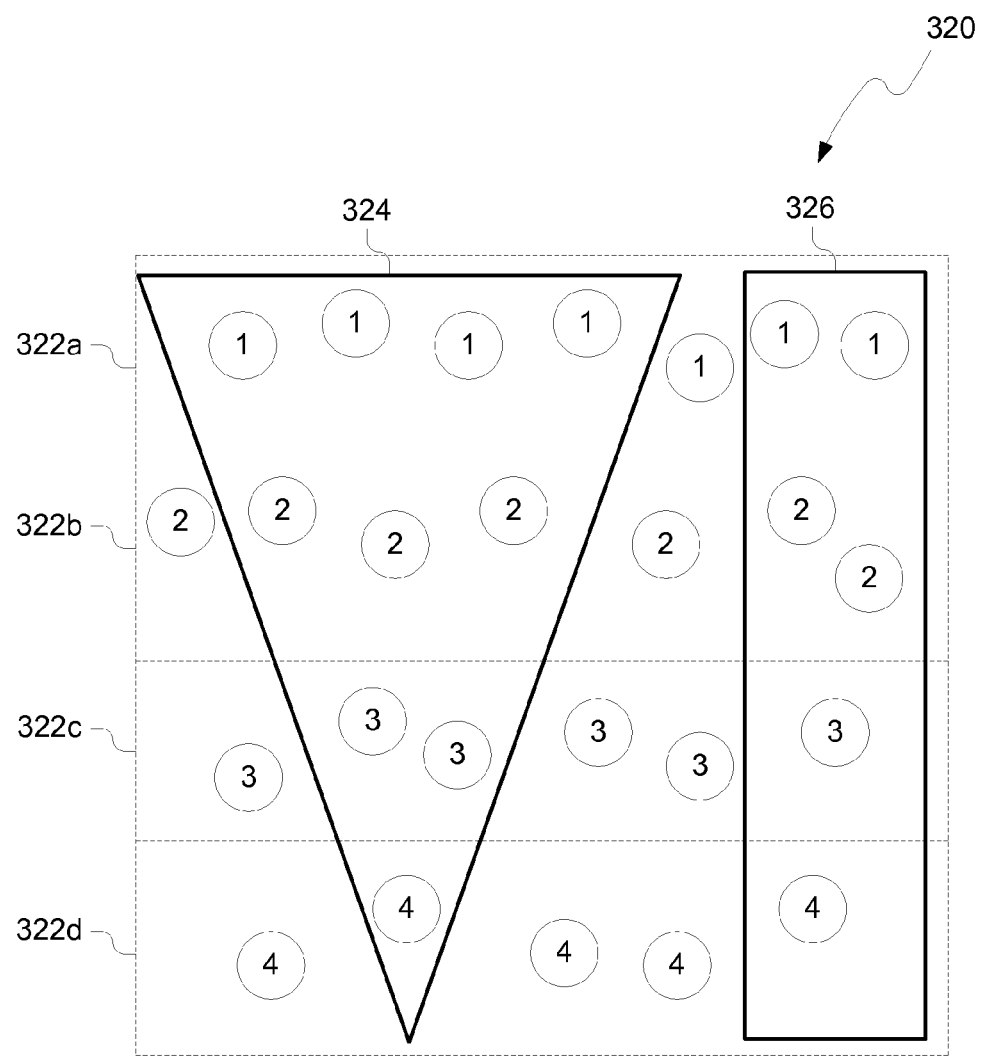
FIG. 3B depicts a visualization of a float item selection, in accordance with an embodiment of the present invention.

In various embodiments, list program 112 assigns each item to a region in a spatial matrix. The spatial matrix represents an area to assign items to various regions. The area indicates a geometric diagram with regions and other shapes to place items into and the select items from. In some embodiments, the spatial matrix represents a two-dimensional area. In other embodiments, the spatial matrix represents a three-dimension area. FIGS. 3A-3B depict illustrative examples of different areas with various regions where items are placed into certain regions based on the respective affinity score for each item. The spatial matrix is a coordinate representation of each area. For example, in a two-dimensional matrix an x and y coordinate or index represents a horizontal and vertical location in depicted each area. One of ordinary skill in the art will appreciate that any coordinate system may be used to represent the areas depicted without deviating from the invention including, but not limited to, radial, spherical, polar, Cartesian, and the like. As a non-limiting example, the spatial matrix includes two types of values for a given coordinate. A first type is an empty space or null value for locations in the area that do not contain an item (e.g., an empty space in the area equals a '0' in the matrix). The second type of value represents the item at the current location based on the coordinates. In some scenario, an identifier such as a file name or unique number is the value for the coordinate (e.g., a file name, song name, or a hash value number for a file). In another scenario, a pointer, link or address is the value for an item in the spatial matrix.

In various embodiments, list program 112 selects a portion of items from the area based on one or more rules. In some scenarios and embodiments, a rule creates a shape to place onto or over the area. For items within, on or near the shape, list program 112 includes the items in a list. As such, the selection shape creates a portion of the area to include in the list, where items in the portion of the area indicated by the selection shape are included in the list. In some scenarios and embodiments, another rule is defined to move, rotate, or scale the shape for subsequent list generations. For example, list program 112 retrieves a rule that indicates a shape should be moved every time a list is generated. In some embodiments and scenarios, after a first list is generated, list program 112 moves the shape and, as a result, different items are included in the new list based on the new location of the shape and the items within the shape. In other scenarios and embodiments, a rule indicates an order items are to be selected from different regions of the area. For example, list program 112 generates a list of items selecting from one region and another. In another scenario, a rule indicates a simulation to perform to items in the spatial matrix and the corresponding area. For example, a "gravity" type simulation is performed to items in the area, with items with similar affinity scores pulling in other items and items with a larger difference in affinity scores pushing away other items. One of ordinary skill in the art that many types of rule may be combined without deviating from the invention. For example, list program 112 performs a simulation rule to initiate an area with items based on affinity scores. Then list program performs a shape rule to generate a shape to select items from the area for a list. Finally, list program 112 performs a rule to move the shape or perform a new simulation for subsequent list generations.

In various embodiments, list program 112 generates a list from the selection of items. Based on one or more rules, list program 112 selects items from the area represented by the spatial matrix. Items within or close to the boundaries of the area are includes in the selection. In some scenarios and embodiments, list program 112 generates an ordered list based on one or more ordering rules. For example, based on usage patterns indicated in usage data 116, the list is ordered on a user preference to listen to a slow tempo song after a fast tempo song. List program 112 orders the list such that the order alternates between songs with fast tempo and then songs with slow tempo. As another example, another ordering rule indicates that affinity scores should alternate. List program 112 orders items in a list such that the affinity changes between items in the ordered list (e.g., the first item has an affinity score of '1', then the second item '2', the third '3', and then the fourth '1', repeating the process until all items in the list have been ordered). In other scenarios and embodiments, list program 112 randomizes the items from the selection. Based on the previous selection of items and the selection rules discussed herein, a pseudo-random set has been created. By randomizing the selection, the illusion of true randomization is provided by list program 112. However, the rule-based selection provides a list with respects to user affinity to items in the list.

Figure 2:
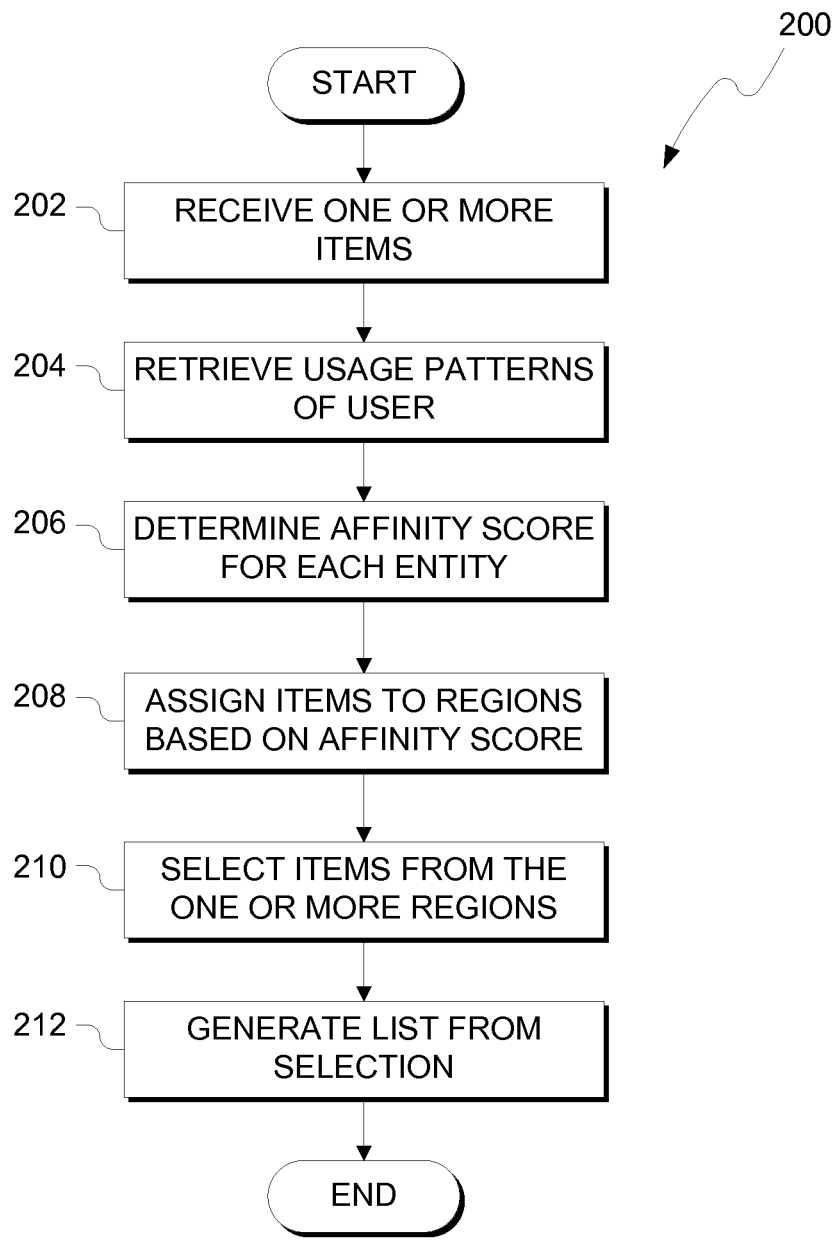
FIG. 2 illustrates operational processes of a list program, on a computing device within the environment of FIG. 1, in accordance with an embodiment of the present invention.

FIG. 2 illustrates operational processes of list program 112, generally designated 200. In process 202, list program 112 receives one or more items. As discussed herein, list program 112 generates a pseudo-random list from the received items. In some embodiments, list program 112 receives the items. In other embodiments, list program 112 receives links, pointers, addresses, or other identifying information associated with the items. In some scenarios and embodiments, list program 112 receives descriptive item data 114 describing the content or type of items received (e.g., metadata for describing the items). In other scenarios and embodiments, list program 112 has access to item data 114 and retrieves item data 114 associated with the received items.

In process 204, list program 112 retrieves usage patterns of a user. In some embodiments, list program 112 receives an indication of a user for which the list is being generated. List program 112 retrieves usage data 116 regarding the indicated user. Usage data 116 for a user indicates frequently viewed, listened, or otherwise interacted with items and the respective descriptive information associated with the items. For example, usage data 116 includes the frequency a user listens to certain genres of music, bands or artists, or any other metadata or descriptive information regarding items previously interacted with by the user. In some embodiments, usage data 116 includes or is further categorized by environmental usages, such as time or location of interactions. For example, usage data 116 includes popular types of videos that are viewed in the morning in addition to popular types of videos that are viewed in the evening.

In process 206, list program 112 determines an affinity score for each item received in process 202. Based on usage data 116 for the user, list program 112 determines an affinity score for the items. The affinity score represents a degree the user prefers content or other descriptive information associated with the item. For example, if usage data 116 indicates that a user listens to music from a particular artist frequently, then list program 112 determines a higher affinity score for received items associated with the artist as opposed to other artists the user listens to less frequently. In some embodiments, list program 112 retrieves current environmental factors associated with the user. Based on the current environmental factors associated with the user, list program 112 determines an affinity score in addition to item frequency information included in usage data 116. For example, if a user frequently watches dramas at night but not as much during the day, list program 112 generates a higher affinity score for drama items when generated at a time later in the day than for dramas if the list is generated earlier in the day.

In process 208, list program 112 assigns the received items to a region in an area. As discussed herein, list program 112 generates a spatial matrix representing an area with various regions. Example visualizations of areas are provided in FIGS. 3A-3C. Each area includes one or more regions. A region is associated with an affinity score or range of affinity scores. For example, list program 112 assigns an item with a particular affinity score to a one region in the area, while assigning another item with a different affinity score to another region. One of ordinary skill in the art will appreciate that any mapping of affinity scores to regions in an area may be used without deviating from the invention. When items are placed into the area, list program 112 updates a corresponding value in the spatial matrix to reflect the item, with one or more elements of the matrix corresponding to the region or location in the area the item is assigned.

In process 210, list program 112 selects items from at least one region in the area. Based on one or more selection rules, list program 112 selects one or more items from the area. In some scenarios and embodiments, a shape is placed onto the area. List program 112 includes, i.e. selects, items within or on the boundaries of the shape. In this scenario, a rule defines the boundaries and location of the shape. Referring to the spatial matrix representation, matrix elements with items assigned that are within the boundaries of the shape are selected for the list. For example, a selection shape is a rectangle with ten elements of width and twenty elements of height. A rule places the rectangular shape with the top left corner in position (3, 7) of the matrix. As such, any items in the matrix that are located in elements of a rectangle with corners (3, 7), (13, 7), (3, 27), and (13, 27) are selected for the list.

In process 212, list program 112 generates a list from the selection of items in process 210. Based on one or more ordering rules, list program 112 generates an ordered list from the selected items. In some scenarios and embodiments, items are ordered based on affinity scores. For example, a rule indicates that the ordering alternate affinity scores in an ascending order then repeat until all the selected items are included in the list (e.g., 1, 2, 3, 1, 2, 3, etc.). As another example, another rule indicates that ordering of the selected items to be based on usage data 116. For example, if usage data 116 indicates the user frequently listens to one artist after the other, then list program 112 orders the list to reflect the usage patterns of the user. In some scenarios and embodiments, list program 112 randomizes the order of the selected items in order to generate the ordered list.

Figure 3C:
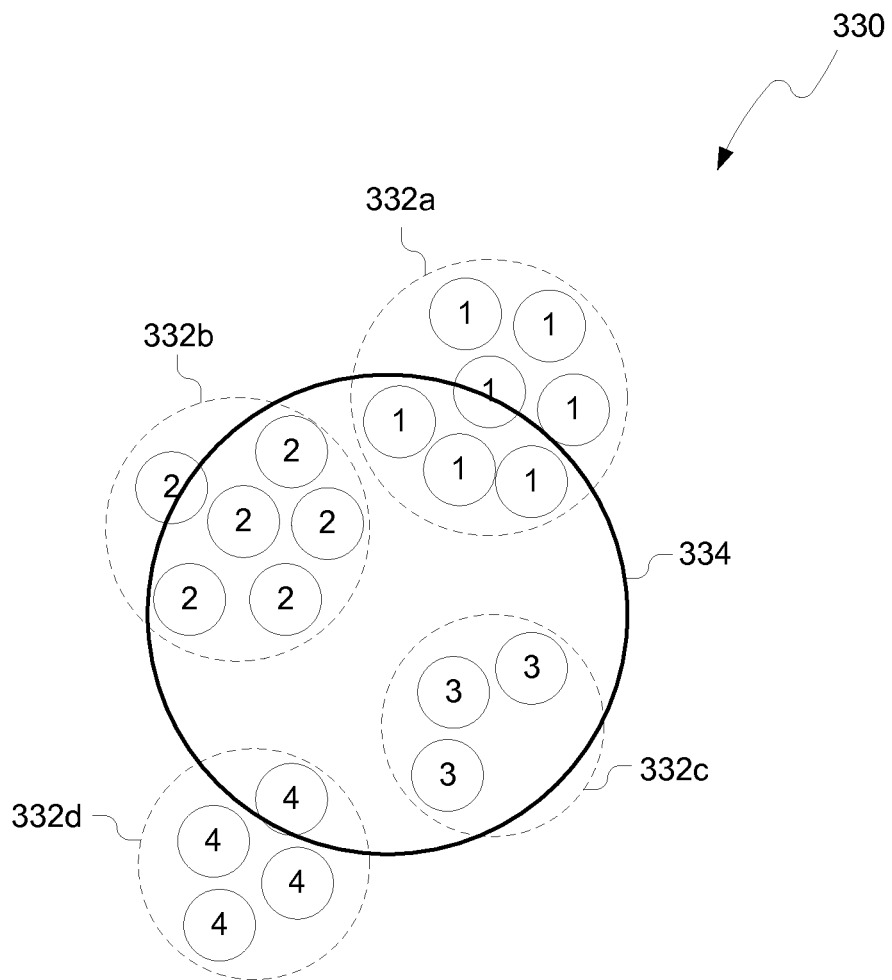
FIG. 3C depicts a visualization of a gravity item selection, in accordance with an embodiment of the present invention.

FIGS. 3A-3C depict example visualizations, 310, 320, and 330, of areas with regions (i.e., 312a-c, 322a-d, and 332a-d) to assign items based on respective affinity scores. The example visualizations also include selection shapes (314, 316, 324, 326 and 334) to produce selected items for generating a list. Referring to FIG. 3A, visualization 310 depicts an area with three concentric circular regions 312a-c. In this example, list pogrom 112 assigns lower affinity scores to the outer circular region 312a and higher affinity scores to inner circular region 312c. In one scenario, list program 112 includes a selection rule to generate a selection shape 314 based on selecting an angular portion of each concentric region 312a-c. In some embodiments, such a shape is used to include a greater portion of (e.g., more items associated with) outer circular region 312a. In this example, six items with affinity scores of '1' are selected. three items with affinity scores of '2' are selected, and two items with the affinity score of '3' are selected). Given that outer circular region 312a is assigned an affinity score associated with a greater likelihood of an interest of the user in an item, such a selection shape would include more items similar to usage data 116 of the user (e.g., '1' rated affinity items in outer circular region 312a). Additionally, selection shape 314 would still incorporate a few items that a user may not have as much of an interest in (e.g., '3' rated affinity items in inner circular region 312c), providing a mix of favorites and occasionally interacted with items. Upon subsequent list generations, list program 112 includes a rule to rotate selection shape 314. As such, new lists will include a similar distribution of items based on affinity score. However, different items will be included with each selection.

As another example, visualizations 310 depicts a spiral vector, a type of linear selection shape, herein denotes as 316, that is moving between circular regions 312a-c. Items that intersect the path of selection shape 316, are included in the selection of items by list program 112. Such a shape provides a more uniformly distributed list of affinity scores, with three items selected from each of the concentric circular regions 312a-c. As with selection shape 314, list program 112 includes a rule to rotate selection shape 316 for subsequent list generations, changing the items that selection shape 316 intersects with, and therefore the items selected by list program 112. In some embodiments, list program 112 can alternate between the two rules for selection shapes 314 and 316 to change the distribution of affinity scores while still using the same region assignment.

Referring to FIG. 3B, visualization 320 depicts an area with four rectangular regions 322a-d, where affinity scores are arrange in an ascending manner. Selection shape 324 selects are larger portion of lower affinity scores when compared to higher affinity scores due to the triangular nature of selection shape 324 and the orientation of selection shape 324 with respect to rectangular regions 322a-d. As such, a distribution of items based on affinity scores can be achieved with selection rule using selection shape 324. Selection shape 326 provides a more uniform selection of items based on affinity scores due to the rectangular shape of selection shape 326. Additionally, list program 112 includes a rule to shift selection shapes 324 and 326 to the left or right to generate different pseudo-random lists.

In some scenarios and embodiments, list program 112 assigns items to regions 322a-d based on both affinity score and environmental usages. For example, list program 112 assigns location of items into regions 322a-d based on the time of day. For example, items with a '1' rated affinity score early in the morning are placed on the left portion of region 322a. Items with a '1' rated affinity score later in the day are placed on the right portion of region 322a. Similarly, items may change affinity score throughout the day. As such, in some embodiments, an item is assigned to multiple regions in the area of visualization 320. For example, list program 112 assigns an item both to the left of region 322c and to the right of 322b, due to usage data 116 indicating the item becomes frequently interacted with later in the day. With such an arrangement, list program 112 determines a list for different times of the day by shifting a selection shape based on the current time of day (e.g., the selection shape is further to the left in the morning and further to the right in the evening). Therefore, list program 112 includes a rule to shift the selection shape based on the current time.

Referring to FIG. 3C, list program 112 assigns items to region groupings 332a-d based on both affinity score. In visualization 330, list program 112 assigns items into grouping 332a-d. After assigning the items to groupings 332a-d, list program 112 performs a simulation rule. In this example, the simulation rule indicates that a "gravitational" simulation be performed before selection. Items with similar affinity scores strongly "pull" items towards one another, while items with a bigger difference in scores would have a weaker "pull". For example, items in grouping 332b and 332c have a greater pull, while items in groupings 332a and 332d have a weaker pull. As such, similar items are grouped closely together. In some scenarios and embodiments, under this arrangement, list program 112 selects an area with selection shape 334 in a center point of grouping 332a-d, as depicted in FIG. 3C. In other scenarios and embodiments, a selection rule indicates a desired density of items. For example, if a larger density is indicated, list program 112 shifts selection shape up to include more of groupings 332a and 332b due to the larger amount of items within the area.

Some embodiments utilize the variation of size or shape of a selection area, for example of selection shapes 314, 316, 324, 326 and 334, to achieve a threshold number of selected items. For example, in some embodiments and scenarios, list program 112 includes portions of each of groupings 332a-d selection shape 334 such that a threshold number of items is included in selection shape 334. In some such embodiments and scenarios, the size of selection shape 334 is increased or decreased such that the threshold is met.

Figure 4:
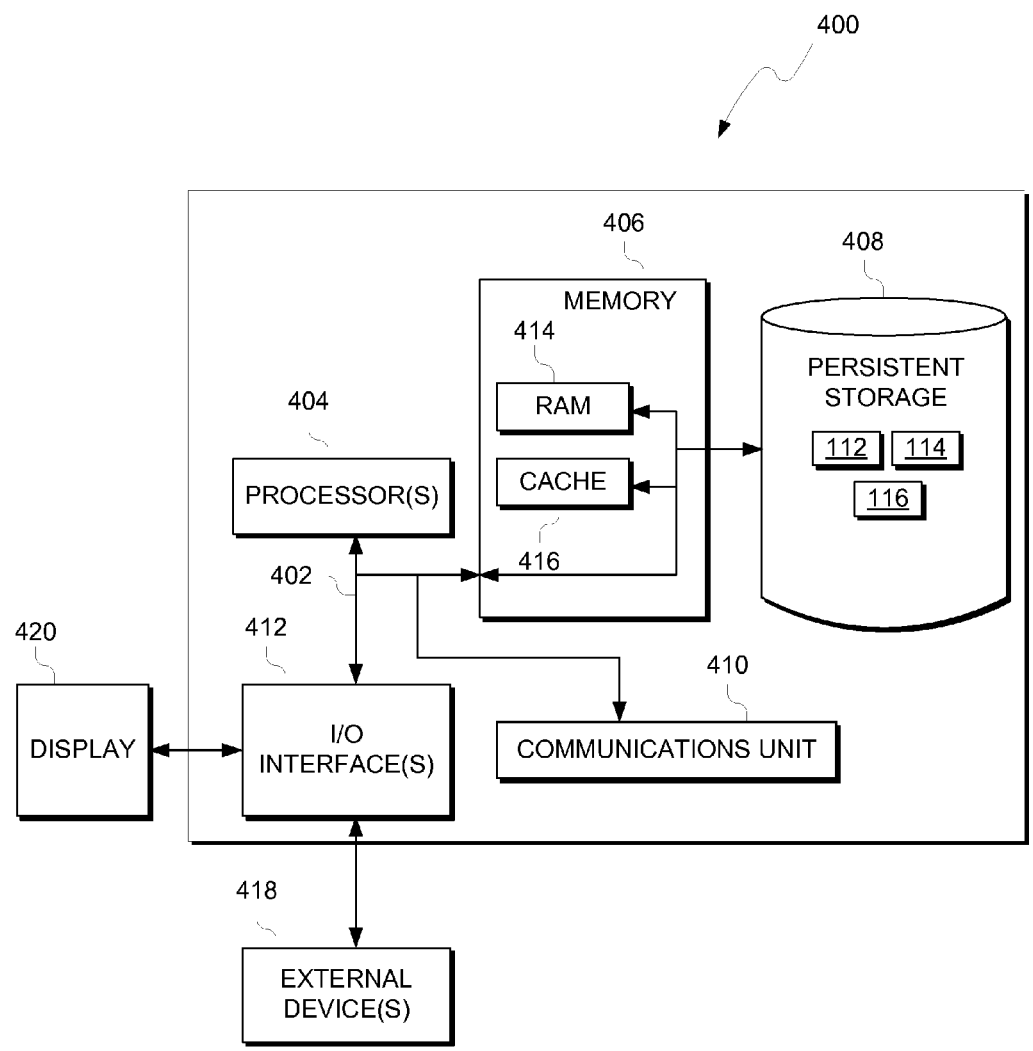
FIG. 4 depicts a block diagram of components of the computing device executing a list program, in accordance with an embodiment of the present invention.

FIG. 4 depicts a block diagram, 400, of components of user device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

User device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

List program 112, item data 114, and usage data 116 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. List program 112, item data 114, and usage data 116 may be downloaded to persistent storage 408 through communications unit 410.

I/O interface(s) 412 allows for input and output of data with other devices that may be connected to user device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., list program 112, item data 114, and usage data 116, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, a plurality of pointers corresponding to a plurality of electronic files;
   determining, by the one or more processors, at least one affinity score for the plurality of electronic files based, at least in part, on one or more usage patterns of a user;
   generating, by the one or more processors, a geometric diagram including a plurality of regions;
   assigning, by the one or more processors, the plurality of pointers to the plurality of regions based, at least in part, on the at least one affinity score;
   generating, by the one or more processors, a spatial matrix based, at least in part, on the plurality of regions of the geometric diagram and the assignment of the plurality of pointers to the plurality of regions, wherein a plurality of values of the spatial matrix correspond to a null values for locations in the area that do not contain an item in the spatial matrix and values represents item at the current location based on the coordinates of the geometric diagram;
   selecting, by the one or more processors, at least one pointer of the plurality of pointers based, at least in part, on a selection area of the geometric area and the corresponding location in the spatial matrix to the selection area, wherein the at least one pointer is located within the selection area; and
   generating, by the one or more processors, a list including the at least one pointer of the plurality of pointers.

2. The method of claim 1, wherein the plurality of regions include at least two concentric circles.

3. The method of claim 2, wherein the selection area is a circular arc including a portion of the at least two concentric circles.

4. The method of claim 2, wherein the selection area is a spiral line intersecting with the at least two concentric circles.

5. The method of claim 1, wherein the plurality of regions include at least two rectangles.

6. The method of claim 5, wherein the selection area is a triangular shape with a greater portion of the triangular shape located in a first rectangle of the least two rectangles and a smaller portion of the triangular shape located in a second rectangle of the least two rectangles.

7. The method of claim 1, the method further comprising:
   moving, by the one or more processors, the plurality of pointers in the geometric area based, at least in part, on the at least one affinity score for the plurality of electronic files, wherein a first set of the plurality of pointers with are moved towards a second set of the plurality of pointers.

8. A computer program product comprising:
   one or more computer-readable storage media and program instructions stored on the one or more computer-readable storage media, the program instructions comprising:
   program instructions to receive a plurality of pointers corresponding to a plurality of electronic files;
   program instructions to determine at least one affinity score for the plurality of electronic files based, at least in part, on one or more usage patterns of a user;
   program instructions to generate a geometric diagram including a plurality of regions, wherein the geometric diagram is represented by a matrix;
   program instructions to assign the plurality of pointers to the plurality of regions based, at least in part, on the at least one affinity score;
   program instructions to generate a spatial matrix based, at least in part, on the plurality of regions of the geometric diagram and the assignment of the plurality of pointers to the plurality of regions, wherein a plurality of values of the spatial matrix correspond to a null values for locations in the area that do not contain an item in the spatial matrix and values represents item at the current location based on the coordinates of the geometric diagram;
   program instructions to select at least one pointer of the plurality of pointers based, at least in part, on a selection area of the geometric area and the corresponding location in the spatial matrix to the selection area, wherein the at least one pointer is located within the selection area; and
   program instructions to generate a list including the at least one pointer of the plurality of pointers.

9. The computer program product of claim 8, wherein the plurality of regions include at least two concentric circles.

10. The computer program product of claim 9, wherein the selection area is a circular arc including a portion of the at least two concentric circles.

11. The computer program product of claim 9, wherein the selection area is a spiral line intersecting with the at least two concentric circles.

12. The computer program product of claim 8, wherein the plurality of regions include at least two rectangles.

13. The computer program product of claim 12, wherein the selection area is a triangular shape with a greater portion of the triangular shape located in a first rectangle of the least two rectangles and a smaller portion of the triangular shape located in a second rectangle of the least two rectangles.

14. The computer program product of claim 8, the program instructions further comprising:

program instructions to move the plurality of pointers in the geometric area based, at least in part, on the at least one affinity score for the plurality of electronic files, wherein a first set of the plurality of pointers with are moved towards a second set of the plurality of pointers.

15. A computer system comprising: one or more computer processors; one or more computer readable storage media; and program instructions stored on the computer readable storage media for execution by at least one of the one or more processors, the program instructions comprising:

program instructions to receive a plurality of pointers corresponding to a plurality of electronic files;

program instructions to determine at least one affinity score for the plurality of electronic files based, at least in part, on one or more usage patterns of a user;

program instructions to generate a geometric diagram including a plurality of regions, wherein the geometric diagram is represented by a matrix;

program instructions to assign the plurality of pointers to the plurality of regions based, at least in part, on the at least one affinity score;

program instructions to generate a spatial matrix based, at least in part, on the plurality of regions of the geometric diagram and the assignment of the plurality of pointers to the plurality of regions, wherein a plurality of values of the spatial matrix correspond to a null values for locations in the area that do not contain an item in the spatial matrix and values represents item at the current location based on the coordinates of the geometric diagram;

program instructions to select at least one pointer of the plurality of pointers based, at least in part, on a selection area of the geometric area and the corresponding location in the spatial matrix to the selection area, wherein the at least one pointer is located within the selection area; and program instructions to generate a list including the at least one pointer of the plurality of pointers.

16. The computer system of claim 15, wherein the plurality of regions include at least two concentric circles.

17. The computer system of claim 16, wherein the selection area is a circular arc including a portion of the at least two concentric circles.

18. The computer system of claim 16, wherein the selection area is a spiral line intersecting with the at least two concentric circles.

19. The computer system of claim 15, wherein the plurality of regions include at least two rectangles.

20. The computer system of claim 19, wherein the selection area is a triangular shape with a greater portion of the triangular shape located in a first rectangle of the least two rectangles and a smaller portion of the triangular shape located in a second rectangle of the least two rectangles.

* * * * *